United States Patent [19]
Stimson et al.

[11] Patent Number: 5,938,433
[45] Date of Patent: Aug. 17, 1999

[54] SOIL REMEDIATION SYSTEM HAVING HEAT-LOSS DUST DECONTAMINATION APPARATUS

[75] Inventors: Martin L. Stimson, Center Point; William David McFarland, Cedar Rapids, both of Iowa

[73] Assignee: Cedarapids, Inc., Cedar Rapids, Iowa

[21] Appl. No.: 08/657,977

[22] Filed: May 30, 1996

[51] Int. Cl.⁶ ............................. F27B 7/36; A47J 36/00
[52] U.S. Cl. ..................... 432/105; 432/106; 432/31; 110/246
[58] Field of Search ............... 432/31, 103, 105, 432/106; 110/246; 47/1.42

[56] References Cited

U.S. PATENT DOCUMENTS

| | | |
|---|---|---|
| 4,175,335 | 11/1979 | Avril . |
| 4,198,201 | 4/1980 | Rohrbach . |
| 4,279,592 | 7/1981 | Grant . |
| 4,285,773 | 8/1981 | Taciuk . |
| 4,376,343 | 3/1983 | White et al. . |
| 4,441,880 | 4/1984 | Pownall et al. . |
| 4,507,081 | 3/1985 | Deve . |
| 4,555,182 | 11/1985 | Mendenhall . |
| 4,600,379 | 7/1986 | Elliott . |
| 4,670,054 | 6/1987 | Hohman et al. . |
| 4,730,564 | 3/1988 | Abboud ................................ 432/106 X |
| 4,765,255 | 8/1988 | Chiarva . |
| 4,827,854 | 5/1989 | Collette . |
| 5,088,856 | 2/1992 | Yocum ................................. 110/246 X |
| 5,164,158 | 11/1992 | Brashears et al. ................... 47/1.42 X |
| 5,195,887 | 3/1993 | Peterson et al. ..................... 432/105 X |
| 5,240,412 | 8/1993 | Mendenhall . |
| 5,273,355 | 12/1993 | May et al. . |
| 5,302,118 | 4/1994 | Renegar et al. . |
| 5,305,696 | 4/1994 | Mendenhall ......................... 432/105 X |
| 5,378,060 | 1/1995 | Brock et al. ........................ 432/106 X |
| 5,455,005 | 10/1995 | Clawson et al. ..................... 110/246 X |
| 5,499,586 | 3/1996 | Davis ....................................... 110/246 |
| 5,596,935 | 1/1997 | Swanson .............................. 110/246 X |
| 5,662,052 | 9/1997 | McIntosh et al. ................... 110/246 X |

*Primary Examiner*—Christopher Kilner
*Attorney, Agent, or Firm*—Marshall, O'Toole, Gerstein, Murray & Borun

[57] ABSTRACT

A soil remediation system having apparatus for decontaminating particulate matter or dust entrained in and exhausted with a hot gas stream from a rotary drum wherein the particulate matter is subjected to heat-loss through an outer cylindrical wall of the drum. The system includes an inclined drum having a burner arrangement for directing a flame and hot gas stream into and axially through the drum ro remediate soil being processed through the drum, and dust decontamination apparatus including a fixed sleeve concentric with a downstream end of the drum such that an annular cavity is formed between the sleeve and the drum, and a filtering arrangement adapted to receive the hot gas stream as the hot gas stream is exhausted from the drum and to remove particulate matter entrained therein. The system is adapted to convey the removed particulate matter to the annular cavity where the particulate matter is decontaminated by heat-loss conductively transferred through and/or radiatively transferred by the cylindrical wall from the flame. A spiral arrangement spaced within the annular cavity lifts the particulate matter up, over and in contact with, the cylindrical wall. The dust decontamination apparatus is adaptable for use with an existing soil remediation plant.

20 Claims, 2 Drawing Sheets

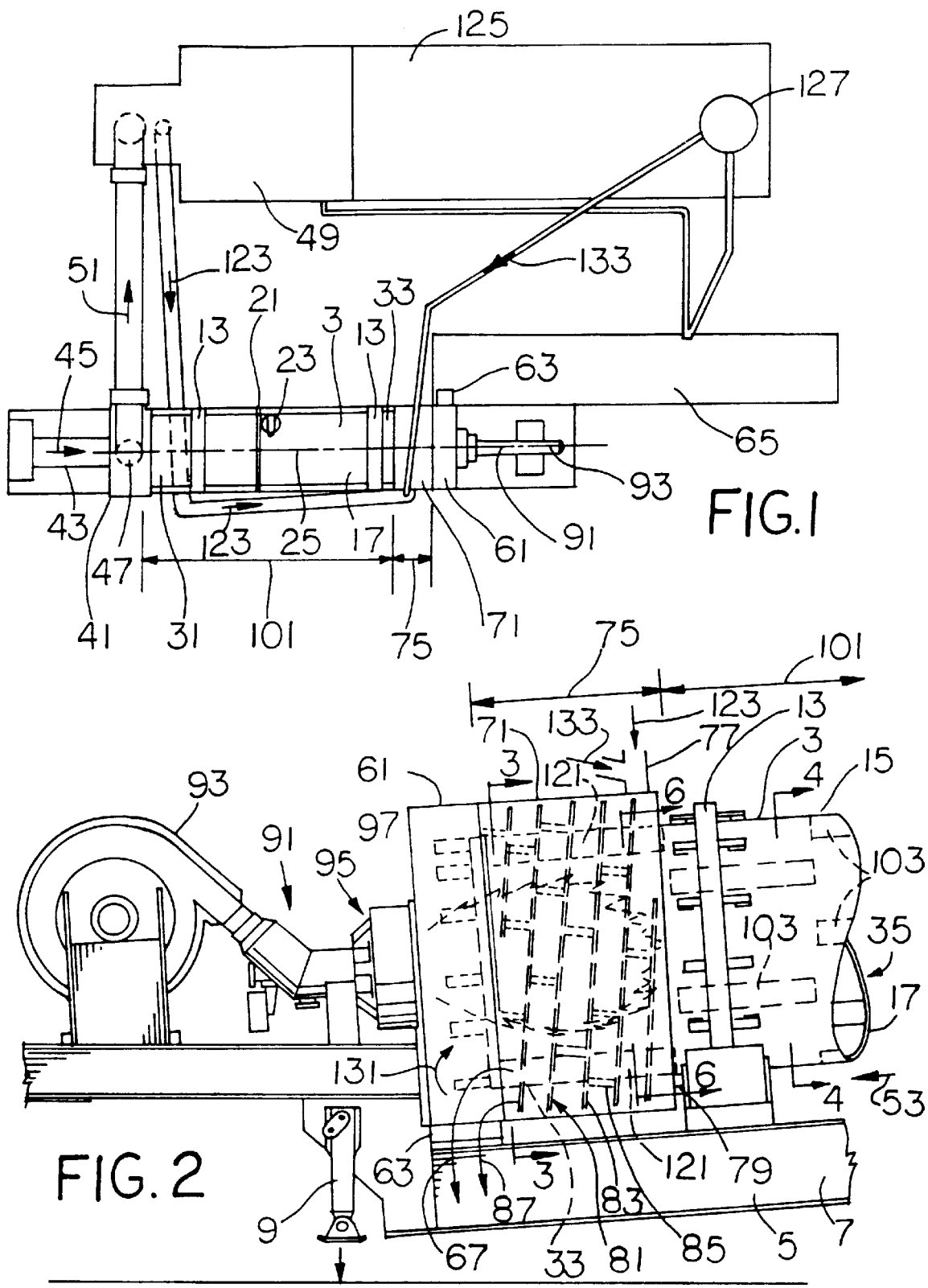

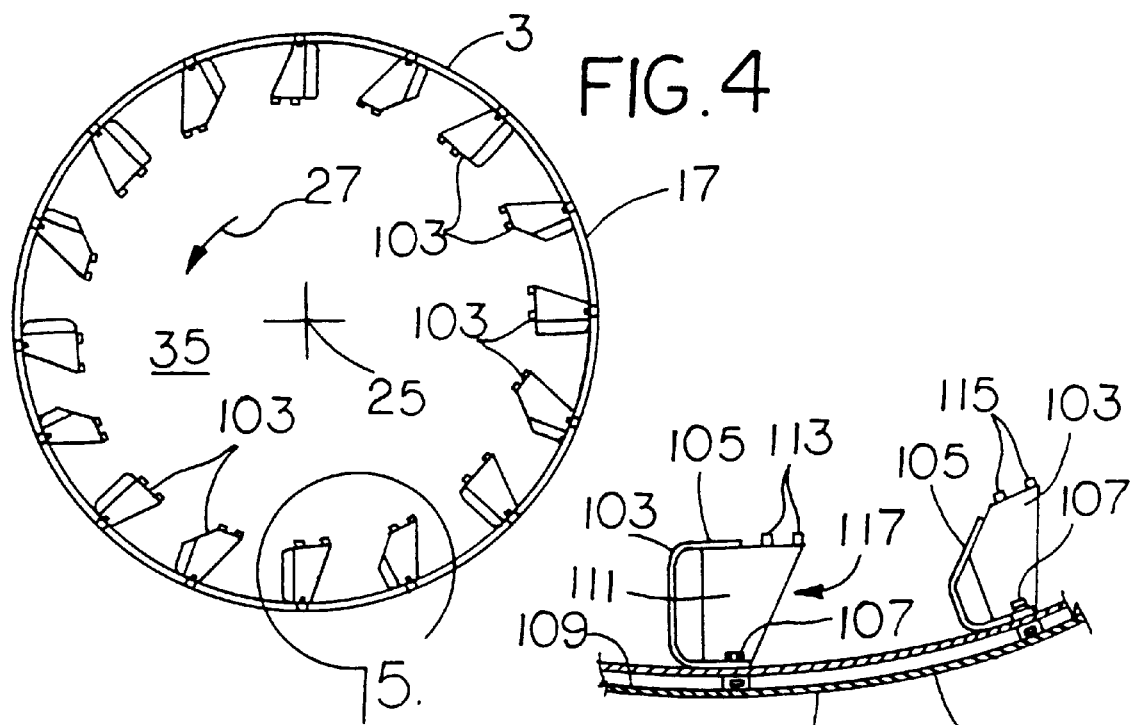
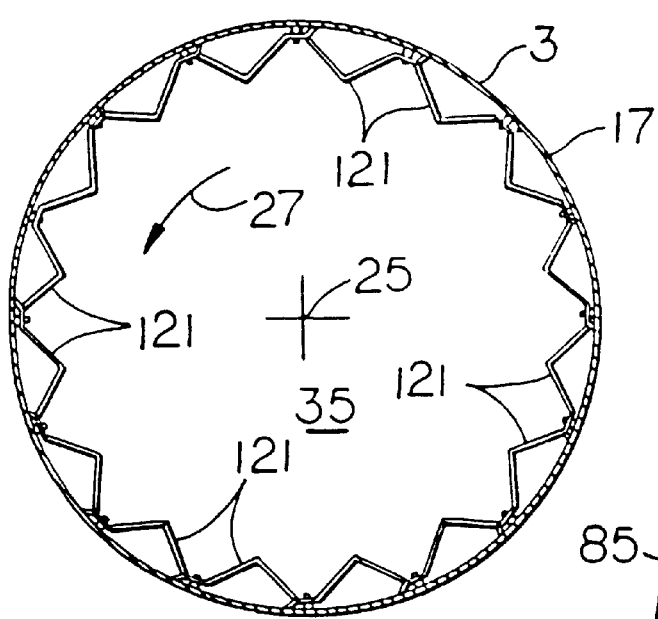
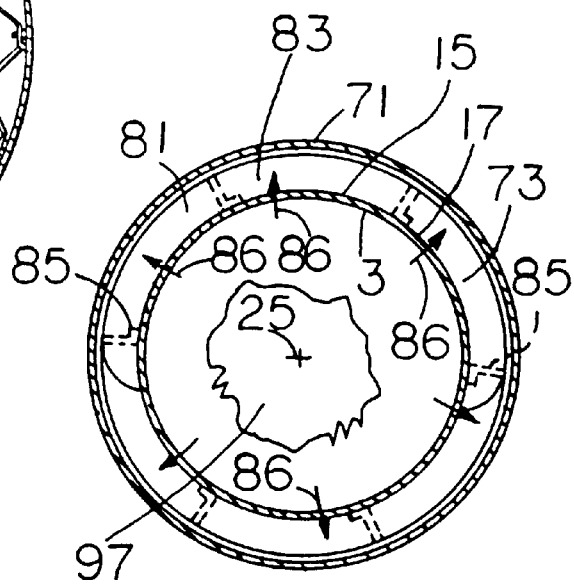

SOIL REMEDIATION SYSTEM HAVING HEAT-LOSS DUST DECONTAMINATION APPARATUS

BACKGROUND OF THE INVENTION

1. Field of the Invention

The present invention relates generally to a plant for remediating contaminated soil and, more particularly, to a soil remediation plant wherein contaminated particulate matter may become entrained in and exhausted with a hot gas stream generated by the plant.

2. Description of the Related Art

Remediation of contaminated soil is, and will continue to be for the foreseeable future, a large and growing industry. For example, soil containing hydrocarbons due to service station ground leakage must be cleaned or removed before ownership of the property can be transferred. The generally applied method of remediating contaminated soil is to heat the soil with a large combustion heater in an inclined rotating drum that causes the contaminated soil, after being introduced into an input end of the drum, to be gravitationally urged toward and discharged from a discharge end of the drum. As the soil is processed through the drum, the soil is heated to a sufficiently elevated temperature by a flame and hot gas stream from the combustion heater whereby volatile contaminants in the soil—typically short-chain hydrocarbons—are released or vaporized from the contaminated soil such that the soil is remediated. The remediated soil is then removed from the rotating drum and cooled for reuse.

The hot gas stream from the combustion burner, including combustion products from the flame of the burner and the vaporized contaminants, are exhausted from the drum. Those exhausted gases and vapors are usually directed, after filtering, into an afterburner. The afterburner generally comprises a second large burner that, in conjunction with the combustion properties of the contaminates, further elevate the temperature of the vapors and gases in order to break down and oxidize the contaminants remaining therein. Short-chain or light hydrocarbons, such as those arising from service station leakage, vaporize at approximately 500° F. and require afterburning at approximately 1600° F.

As the hot gas stream passes through the drum and interacts with the contaminated soil being processed therethrough, airborne-prone particulate matter from the contaminated soil becomes entrained in and swept along by the hot gas stream. As a result, entrained particulate matter is exhausted from the drum along with the hot gases. During the filtering process, either in a cyclone separator, baghouse filter or a combination of the two, the particulate matter is removed from the exhausted hot gases. Although the afterburner is designed to oxidize and render harmless the vaporized contaminants, the particulate matter is not so treated and continues to be a source of undesirable contamination. Therefore, the particulate matter, sometimes referred to as dust or "fines", is generally added back to the contaminated soil being processed in the drum to undergo further oxidation.

Unfortunately, by the time the fines have been filtered from the hot gas stream and returned to the drum, the temperature of those fines has generally cooled to approximately 250°–300° F. The temperature of those cooler fines being added back into the drum needs to be elevated to the temperature of the soil being remediated. As the fines can constitute a substantial portion of the total soil/material load being processed in the drum, 20–30% for example, heating of those fines represents a major loss of efficiency in terms of reduced output in tons per hour of the plant. In fact, the greater the percentage of fines, the greater the loss in efficiency.

Due to the extra thermal energy required to decontaminate the cooled fines added back to the drum, the combustion burner must be operated at a higher thermal output. Operating the combustion burner at a higher thermal output, in turn, generally creates a more vigorous hot gas stream which increases entrainment and further compounds the fines problem.

Further, the drum is necessarily hot in order to provide the relatively high temperatures needed to remediate the contaminated soil. As a result, substantial thermal energy is wasted due to heat loss through the cylindrical wall of the drum to the surrounding ambient atmosphere.

What is needed is a soil remediation system and apparatus for a soil remediation plant wherein particulate matter entrained in and exhausted with a hot gas stream from a rotary drum can be decontaminated without substantially reducing thermal efficiency of the soil remediation plant and, preferably, wherein the decontamination of the particulate matter can be realized by utilizing some of the thermal energy otherwise lost through the drum wall to the ambient atmosphere, thereby substantially reducing or entirely eliminating the substantial additional thermal load placed on prior art soil remediation plants by adding back the contaminated fines.

SUMMARY OF THE INVENTION

An improved soil remediation system for decontaminating dust or particulate matter entrained in and exhausted with a hot gas stream from a rotating drum of the plant by subjecting the particulate matter to heat-loss through an exterior wall of the drum.

The system includes an inclined rotary drum having a longitudinal axis, an input end, a discharge end, a cylindrical wall and a chamber extending axially within the cylindrical wall substantially from the input end to the discharge end, upstream and downstream housings configured to rotatably and respectively receive the input and discharge ends of the drum, an input arrangement for introducing contaminated soil containing airborne-prone particulate matter into the chamber near the input end, a burner arrangement for directing a flame and hot gas stream into the chamber at the discharge end for interacting with the contaminated soil containing airborne-prone particulate matter and for remediating the contaminated soil, a discharge arrangement for discharging the soil, after remediation thereof, from the chamber near the discharge end, a filtering arrangement for receiving the hot gas stream including any of the airborne-prone particulate matter entrained therein and for filtering the entrained particulate matter from the hot gas stream, heat-loss decontamination apparatus configured to decontaminate the particulate matter filtered from the hot gas stream by subjecting the particulate matter to thermal energy escaping through the wall of the drum, and a power arrangement for rotating the drum about the longitudinal axis.

The decontamination apparatus generally includes a fixed sleeve spaced concentric with the discharge end of the drum such than an annular cavity is formed between the drum and the fixed sleeve. The system is adapted to decontaminate the particulate matter by heat loss transferred conductively through and radiatively by the drum wall. A spiral arrangement spaced within the annular cavity is configured to operatively convey the particulate matter up, over and in contact with the drum as the drum is rotated about its longitudinal axis. If needed, thermal energy may be conveyed from an afterburner stack to the annular cavity to assist with decontamination of the particulate matter in the annular cavity.

The heat-loss dust decontamination apparatus is adaptable for use with existing soil remediation equipment.

PRINCIPAL OBJECTS AND ADVANTAGES OF THE INVENTION

The principal objects and advantages of the present invention include: providing a soil remediation system and apparatus for a soil remediation plant wherein particulate matter entrained in and exhausted with a hot gas stream from a rotary drum of the system or plant is decontaminated by subjecting the particulate matter to heat loss transferred through an exterior wall of the rotary drum; and generally providing such a soil remediation system and apparatus for a soil remediation plant wherein each is reliable in performance and particularly well adapted for the proposed usages thereof.

Other objects and advantages of this invention will become apparent from the following description taken in conjunction with the accompanying drawings wherein are set forth, by way of illustration and example, certain embodiments of this invention.

BRIEF DESCRIPTION OF THE DRAWINGS

FIG. 1 is a plan view of a soil remediation system having heat-loss dust decontamination apparatus, according to the present invention.

FIG. 2 is an enlarged and partially schematic, fragmentary side elevational view of the soil remediation system having heat-loss dust decontamination apparatus, showing among other things a combustion zone, spiral flighting and a fixed sleeve thereof.

FIG. 3 is an enlarged and fragmentary, cross-sectional view of the soil remediation system having heat-loss dust decontamination apparatus, taken along line 3—3 of FIG. 2.

FIG. 4 is a further enlarged and fragmentary, cross-sectional view of the soil remediation system having heat-loss dust decontamination apparatus, taken along line 4—4 of FIG. 2 and showing bucket flights in a heating zone thereof.

FIG. 5 is a still further enlarged and fragmentary, cross-sectional view of the soil remediation system having heat-loss dust decontamination apparatus, taken from detail 5 of FIG. 4 and showing the bucket flights in greater detail.

FIG. 6 is a further enlarged and fragmentary, cross-sectional view of the soil remediation system having heat-loss dust decontamination apparatus, taken along line 6—6 of FIG. 1 and showing combustion flights in the combustion zone, according to the present invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to a soil remediation system and apparatus for a soil remediation plant wherein particulate matter entrained in and exhausted with a hot gas stream generated within the system 1 is decontaminated by subjecting the particulate matter to heat loss from the system 1 in accordance with the present invention, as shown in FIGS. 1 through 6. The system 1 generally includes a cylindrically shaped rotary drum 3 supported on frame means 5. The frame means 5 generally comprises a pair of spaced apart, parallel beams 7, inclined from a horizontal orientation and supported by vertical legs 9 or the like, such as outriggers wherein the system 1 has a mobile configuration. Mounted on the parallel beams 7 are a plurality of rollers (not shown) that supportingly receive tire or trunnion rings 13 secured to an exterior surface 15 of an outer wall 17 of the rotary drum 3, as shown in FIG. 2. A saddle chain and sprocket arrangement 21, driven by a motor 23, causes the rotary drum 3 to be rotated about a longitudinal axis 25, as indicated by numeral 27 in FIGS. 4 and 6.

The rotary drum 3 has an input end 31 and a discharge end 33 which, in conjunction with the outer wall 17, form a chamber 35 within the wall 17 and generally extending from the input end 31 to the discharge end 33 of the drum 3.

Located at the input end 31 of the drum 3 is a fixed and substantially closed input housing 41 having a circular opening to rotatably receive the input end 31 of the drum 3. A material conveyor 43, penetrating the input housing 41 and extending into the input end 31 of the rotary drum 3, is adapted to direct contaminated soil into the chamber 35 of the rotary drum 3, as indicated by the arrow designated by the numeral 45 in FIG. 1. An upper end or exhaust duct 47 of the input housing 41 is adapted to be connected to conventional air pollution control equipment 49, such as a centrifugal or cyclone separator or baghouse or a combination of the two, to remove particulate matter, or dust, entrained in gases exhausted from the system 1, as indicated by the arrow designated by the numeral 51.

The longitudinal axis 25, about which the rotary drum 3 is rotated, is inclined such that the input end 31 is elevated above the discharge end 33. The rotary drum 3 is sufficiently inclined whereby materials being processed through the chamber 35 of the rotary drum 3 are gravitationally urged downstream toward the discharge end 33 of the rotary drum 3, as indicated by the arrow designated by the numeral 53 in FIG. 2.

Located at the discharge end 33 of the drum 3 is a fixed discharge housing 61. The discharge housing 61 includes a circular opening to rotatably receive the discharge end 33 of the rotary drum 3. A discharge chute 63 situated at a lower portion of the discharge housing 61 is adapted to discharge and direct materials processed by the rotary drum 3 from the chamber 35 to a pugmill 65 or other apparatus for further handling or processing of the materials discharged from the drum 3 as desired, as indicated by the arrow designated by the numeral 67 in FIG. 2.

Supported by and spaced upstream from the discharge housing 61 is a cylindrically shaped fixed sleeve 71. The sleeve 71, which is concentric with the rotary drum 3 received therethrough, is spaced apart from the drum 5 such that an annular cavity 73 is formed between the sleeve 71 and the drum 3. Preferably, the longitudinal dimension of the sleeve 71 is substantially coextensive with a combustion zone 75, hereinafter described. It is to be understood that the axial extension of the sleeve 71 may be greater than or less than the axial extension of the combustion zone 75, depending on the particular application. An input chute 77 situated at or near the upstream end of the sleeve 71 provides access for introducing material into the annular cavity 73, as schematically shown in FIG. 2 and as hereinafter described.

In addition to a seal arrangement 79 situated at the juncture between the sleeve 71 and the drum 3 and arrangements (not shown) provided for inputting contaminated soil into the chamber 35 and contaminated particulate matter into the annular cavity 73, the system 1 is constructed generally air tight to prevent contaminated gases and vapors from escaping into the ambient atmosphere.

Substantially coextensive with the sleeve 71 and attached to the outer surface 15 of the wall 17 of the drum 3 is a spiral arrangement 81. The spiral arrangement 81 includes a radially oriented spiral rib 83 with crossbars 85 connected between adjacent turns of the spiral rib 83, as shown in FIG. 2. The spiral rib 83 and crossbars 85 are configured such that material introduced into the annular cavity 73 through the input chute 77 is lifted up and over the drum 3 as that material is urged downstream toward the discharge end 33 and through the discharge chute 63 by the rotating spiral rib 83, as indicated by the arrow designated by the numeral 87 in FIG. 2. For example, the material being processed through the annular cavity 73 may be lifted up and over the drum 3 four, five or more times by the crossbars 85.

A burner assembly 91, supported by the discharge housing 61, includes a blower 93 situated near the discharge end 33 of the drum 3, as shown in FIG. 2. The blower 93 is adapted to force air through a burner head 95, such that a flame 97 and concurrent hot gas stream are directed axially through the chamber 35, with the hot gas stream being exhausted through the exhaust duct 47.

Within the chamber 35 is the combustion zone 75 and a heating zone 101, both spaced upstream from the burner head 95. The combustion zone 75 extends from adjacent to the discharge end 33 and continues upstream from the burner head 95 to a point beyond the reach of the flame 97; the heating zone 101 extends from the combustion zone 97 to adjacent to the input end 31 of the drum 3, as indicated in FIG. 1.

Attached to the wall 17 and spaced within the chamber 35, at different regions throughout the interior of the drum 3, are one or more types of flightings or paddles for the alternative purposes of lifting, tumbling, etc., of material being processed within and through the chamber 35. The actions of the various flightings are known to those skilled in the art and, accordingly, the flightings now discussed describe workable embodiments but are not intended to be exhaustive of the various combinations which could be utilized with the present invention.

For example, the flighting in the heating zone 101 is typically configured as open-topped bucket flights 103, as shown in FIGS. 4 and 5. The bucket flights 103 are arranged longitudinally and generally parallel with the axis 25 of the drum 3. Generally, the bucket flights 103 are arranged in a plurality of sections spaced sequentially along the axis 25, with the spacings of the bucket flights 103 of each of the sections staggered relative to the spacings of the bucket flights 103 of adjacently spaced sections, as shown in FIG. 2.

Each of the bucket flights 103 has a bottom portion 105 supported by brackets 107 secured to the interior surface 109 of the wall 17 of the rotary drum 3. Spaced apart bucket side walls 111 are connected to the bottom portion 105. Mounted on outermost ends of the bucket side walls 111 are parallel bars 113 which form elongate openings 115 on the sides of the bucket flights 103.

As configured and arranged, contaminates soil being gravitationally urged along the bottom of the drum 3 will be picked up by the bucket flights 103 as the drum 3 is rotated about the axis 25. As the bucket flights 103 are rotated upwardly, contaminated soil falls through the elongate openings 115 formed by the parallel bars 113 mounted on the bucket side walls 111. As the bucket flights 103 are rotated further upwardly, contaminated soil spills from an open top 117 of the bucket flights 103 with all of the virgin aggregate being discharged therefrom as the bucket flights 103 continue over the top of their arcuate displacement and descend back to the bottom of the drum 3 to repeat the cycle. In other words, the bucket flights 103 create curtains of falling contaminated soil across the chamber 35 in the heating zone 101 by lifting and gradually dropping the contaminated soil as rotation of the drum 3 causes the bucket flights 103 to be arcuately displaced across the upper reaches of the chamber 35.

In the combustion zone 75, the flighting is configured as low-profile combustion flights 121, as shown in FIG. 6. As with the bucket flights 103, the combustion flights 121 are arranged longitudinally and generally parallel with the axis 25 of the drum 3. Instead of being lifted and veiled, however, contaminated soil being processed by the combustion flights 121 in the combustion zone 75 is generally tumbled and turned across the bottom and along the lower sides of the wall 17 as the drum 3 is rotated in order to avoid extinguishing the flame 97 by falling material within the combustion zone 75.

As the air pollution control equipment 49 removes the particulate matter from the exhausted gases 51, the system 1 is adapted to convey the particulate matter back to the input chute 77, as indicated by the arrows designated by the numeral 123 in FIG. 1, such as by auger conveyors or other suitable arrangement. The exhausted gases 51, from which the particulate matter has been removed, are directed into an afterburner 125 for cleansing wherein any remaining vapor or gaseous contaminants in the gases 51 are oxidized by methods commonly known in the art. The gases 51 are then released to the atmosphere through a stack 127.

In an application of the present invention, the drum 3 is rotated about the axis 25 and the burner assembly 91 is activated such that the flame 97 and concurrent hot gas stream are directed into the combustion zone 75. The hot gas stream continues upstream from the combustion zone 75 and through the heating zone 101 to the input end 31, whereat the hot gas stream is exhausted through the exhaust duct 47 to the air pollution control equipment 49.

Also, contaminated soil is introduced into the chamber 35 near the input end 31 by the material conveyor 43. As the drum 3 is inclined, the contaminated soil is gravitationally urged downstream 53 in countercurrent flow relative to the hot gas stream. As the contaminated soil is urged through the heating zone 101, the bucket flights 103 lift and drop the contaminated soil, forming falling curtains of the contaminated soil. As the hot gas stream flows through the curtains of falling contaminated soil, the contaminated soil is convectively heated by the hot gas stream. As a result, volatile contaminants in the contaminated soil are vaporized. Some of those vaporized contaminants are oxidized, while the remainder of the vaporized contaminants are swept along with the hot gas stream.

As the contaminated soil is conveyed from the heating zone 101 into the combustion zone 75, the contaminated soil is no longer formed into falling curtains. Instead, the contaminated soil is tumbled and turned across the bottom and lower sides of the chamber 35 as the drum 3 is rotated. As the contaminated soil is tumbled and turned, the contaminated soil is further heated by thermal energy radiatively transferred from the flame 97, conductively transferred from the combustion flights 121 and the wall 17, and convectively transferred from the hot gas stream. As a result, substantially all remaining contaminants in the contaminated soil are vaporized. In the combustion zone 75, a substantial portion of the vaporized contaminants are directly oxidized by the flame 97 and hot gas stream.

As the contaminated soil is processed through the heating zone 101 and the combustion zone 75, a substantial portion of the contaminated soil becomes airborne as particulate matter, or dust. The particulate matter becomes entrained in the hot gas stream and is exhausted from the chamber 35 along with the hot gas stream. Some of the airborne particulate matter becomes entrained in the hot gas stream in the vicinity of the combustion zone 75 and, as a result of the higher temperatures incurred thereby, may not contain contaminants. However, much of the airborne particulate matter becomes entrained in the hot gas stream farther upstream where the flame 97 is more remote and where the hot gas stream is cooler due to loss of thermal energy to the contaminated soil; as a result, that entrained particulate matter does contain contaminants.

In the air pollution equipment 49, the particulate matter is separated from the hot gases, with the vaporized contaminants in the hot gases being rendered harmless by the afterburner 125 before the hot gases are released into the atmosphere. The particulate matter or dust separated from the hot gases in the air pollution control equipment 49 must undergo further processing as it contains unoxidized contaminants as hereinbefore described. Therefore, the particulate matter is conveyed from the pollution control equipment 49 to the input chute 77 where the particulate matter is deposited in the upstream end of the annular cavity 73.

The annular cavity 73 is radially inwardly bounded by the wall 17 of the rotating drum 3. On the other side of the wall 17 from the annular cavity 73 is the combustion zone 75, which is generally substantially coextensive with the annular cavity 73, as aforesaid. In prior art soil remediation systems, thermal energy conducted through the wall 17 would be radiated to the ambient atmosphere and wasted as heat-loss. In the present invention, however, the thermal energy conducted through the wall 17 as indicated by the arrows designated by the numeral 86 in FIG. 3, which would otherwise be heat-loss, is absorbed by the particulate matter being processed through the annular cavity 73 by the spiral rib 83 and the crossbars 85.

The residence time of the particulate matter being processed through the annular cavity 73 and the resultant temperatures are sufficient to remediate the particulate matter by vaporizing the volatile contaminants remaining therein. The residence time of the particulate matter in the annular cavity 73 is dependent upon several factors, including rate of rotation of the drum 3, degree of inclination of the drum 3, pitch of the spiral rib 83, spacing of the input chute 77 relative to the discharge chute 63, etc.

The remediated particulate matter is discharged from the downstream end of the annular cavity 73, as indicated by the arrow designated by the numeral 87 in FIG. 2. Preferably, the remediated particulate matter is discharged together with, but somewhat shielded or curtained by the remediated soil being discharged from the combustion zone 75, as indicated by the arrow designated by the numeral 67 in FIG. 2, such that the airborne-prone particulate matter is directed into the discharge chute 63 and largely prevented from rising upwardly where it could be cycled through the system 1 again.

The temperatures of the remediated soil and the remediated particulate matter in the vicinity of the discharge chute 63 are sufficiently elevated that any tendency of contaminants vaporized in the annular cavity 73 from the particulate matter to condense on the remediated soil and the remediated particulate matter is minimal. Thus, the vaporized contaminants from the annular cavity 73 rise upwardly, as indicated by the arrow designated by the numeral 131, to be cycled back through the system 1 where the vaporized contaminants are generally oxidized either in the combustion zone 75 or in the afterburner 125, as aforesaid.

By comparison, the particulate matter would be introduced back into the main chamber of prior art crushers. As a result, burners of those systems would have to be operated at a higher thermal output to provide the necessary temperatures to overcome the cooling effect of dumping the cooler dust on the soil being remediated. In addition, the higher thermal output would generally include a more vigorous hot gas stream which, in turn, would tend to entrain greater quantities of contaminated particulate matter therein.

In contrast, the present invention does not introduce the contaminated particulate matter back into the chamber 35. Instead, the thermal energy needed to remediate the contaminate particulate matter is provided by the otherwise wasted, heat-loss conducted through the wall 17 of the drum 3. As a result, the burner assembly 91 can generally be operated at a lower thermal output than prior art soil remediation systems, thereby saving fuel and reducing the quantity of contaminated particulate matter otherwise swept along by the hot gas stream.

In addition, temperatures of gases exhausted by the stack 127 typically range between 1400°–1800° F. In other words, substantial quantities of thermal energy are also lost to the ambient atmosphere at the stack 127. If, in a particular application of the present invention, additional thermal energy is needed to remediate the contaminated particulate matter in the annular cavity 73, heat from the stack 127 may be added to the annular cavity 73 as desired, as indicated by the arrow designated by the numeral 133 in FIG. 1, to provide additional salvaging of heat-loss for decontaminating the particulate matter. Thermal energy supplied by the stack 127 would generally have a temperature of up to approximately 1600°–1800° F. as it is added to the annular cavity 73.

It will be understood that certain features and subcombinations are of utility and may be employed without reference to other features and subcombinations. This is contemplated by and is within the scope of the claims.

It is to be understood that while certain forms of the present invention have been illustrated and described herein, it is not to be limited to the specific forms or arrangement of parts described and shown.

What is claimed and desired to be secured by Letters Patent is as follows:

1. A system for remediating contaminated soil containing airborne-prone particulate matter, comprising:
   a) an inclined rotary drum having a longitudinal axis, an input end, a discharge end, a cylindrical wall and a chamber extending axially within said cylindrical wall substantially from said input end to said discharge end;
   b) support means for supporting said drum, including an upstream housing and a downstream housing wherein said upstream and downstream housings are configured to rotatably and respectively receive said input end and said discharge end of said drum;

c) input means for introducing the contaminated soil containing airborne-prone particulate matter into said chamber near said input end;

d) burner means for directing a flame and hot gas stream into said chamber at said discharge end for interacting with the contaminated soil containing airborne-prone particulate matter and for remediating the contaminated soil;

e) discharge means for discharging the soil, after remediation thereof, from said chamber near said discharge end;

f) filtering means connected to said upstream housing for receiving said hot gas stream, including any of the airborne-prone particulate matter entrained therein, from said upstream housing and for filtering the entrained particulate matter from said hot gas stream;

g) decontamination means for decontaminating the particulate matter filtered from said hot gas stream by subjecting the particulate matter to thermal energy escaping through said wall of said drum; and h) rotating means for rotating said drum about said longitudinal axis.

2. The system according to claim 1, wherein said decontamination means includes a fixed sleeve spaced concentric with said discharge end of said drum such than an annular cavity is formed between said drum and said fixed sleeve, said annular cavity configured to operatively receive the particulate matter therethrough as said particulate matter is being decontaminated.

3. The system according to claim 2, wherein the particulate matter being decontaminated is introduced into an upstream end of said annular cavity.

4. The system according to claim 2, wherein the particulate matter is decontaminated by heat loss conductively transferred through said cylindrical wall of said drum.

5. The system according to claim 2, wherein the particulate matter is decontaminated by heat loss radiatively transferred by said cylindrical wall of said drum.

6. The system according to claim 4, wherein the particulate matter is also decontaminated by heat loss radiatively transferred by said cylindrical wall of said drum.

7. The system according to claim 2, including a spiral arrangement spaced within said annular cavity wherein said spiral arrangement is configured to operatively convey the particulate matter being decontaminated therein over said drum as said drum is rotated about said longitudinal axis.

8. The system according to claim 2, wherein the particulate matter is heated to approximately the temperature of the soil being remediated in said annular cavity.

9. The system according to claim 2, wherein contaminants vaporized from the particulate matter in said annular cavity are directed into said chamber near said discharge end of said drum.

10. The system according to claim 2, wherein said particulate matter is discharged from said annular chamber along with said remediated soil being discharged from said chamber.

11. The system according to claim 2, including:

a) an afterburner having a stack; and b) wherein said annular cavity is configured to operatively receive thermal energy from said stack for decontaminating the particulate matter therein.

12. The system according to claim 2 wherein said annular chamber is spaced radially outwardly from said flame.

13. The system according to claim 2 wherein said annular chamber is configured to be substantially axially coextensive with said flame.

14. The system according to claim 2 wherein said decontamination means is configured such that substantially all volatile contaminants contained in the particulate matter as the particulate matter is introduced into said annular cavity are vaporized in said annular cavity.

15. A mechanism for decontaminating particulate matter filtered from a hot gas stream exhausted from a soil remediation plant having a rotary drum with a cylindrical wall, a downstream portion of which encircles a flame for generating the hot gas stream and for remediating contaminated soil conveyed through the drum, the mechanism comprising a fixed sleeve spaced concentrically with and spaced apart from said downstream portion such that an annular cavity is formed therebetween, wherein said annular cavity is configured to operatively decontaminate the particulate matter by heat-loss through the cylindrical wall from the flame as the particulate matter is conveyed through said annular cavity.

16. The mechanism according to claim 15, wherein the soil remediation plant includes an afterburner with an exhaust stack, the mechanism further including means for conveying thermal energy from the exhaust stack to said annular cavity for decontaminating the particulate matter in said annular cavity.

17. The mechanism according to claim 15, wherein the particulate matter is decontaminated by heat loss conductively transferred through the cylindrical wall of the drum.

18. The mechanism according to claim 15, wherein the particulate matter is decontaminated by heat loss radiatively transferred by the cylindrical wall of the drum.

19. The mechanism according to claim 15, including a spiral arrangement spaced within said annular cavity wherein said spiral arrangement is configured to operatively convey the particulate matter being decontaminated therein over the drum as the drum is rotated about a longitudinal axis thereof.

20. The mechanism according to claim 15 wherein said annular cavity is configured to be substantially axially coextensive with the flame.

* * * * *